(12) United States Patent
Barp

(10) Patent No.: US 10,926,728 B2
(45) Date of Patent: Feb. 23, 2021

(54) UPGRADE KIT FOR A ROLL-BAR OF A HISTORIC SINGLE-SEATER CAR AND UPGRADE METHOD OF A ROLL-BAR OF A HISTORIC SINGLE-SEATER CAR

(71) Applicant: FERRARI S.p.A., Modena (IT)

(72) Inventor: Luigino Barp, Modena (IT)

(73) Assignee: FERRARI S.p.A., Modena (IT)

( * ) Notice: Subject to any disclaimer, the term of this patent is extended or adjusted under 35 U.S.C. 154(b) by 103 days.

(21) Appl. No.: 16/406,198

(22) Filed: May 8, 2019

(65) Prior Publication Data
US 2019/0344742 A1 Nov. 14, 2019

(30) Foreign Application Priority Data

May 9, 2018 (IT) .......................... 102018000005218

(51) Int. Cl.
*B60R 21/13* (2006.01)
*B60R 21/00* (2006.01)

(52) U.S. Cl.
CPC .............. *B60R 21/13* (2013.01); *B60R 21/00* (2013.01); *B60R 2021/0018* (2013.01)

(58) Field of Classification Search
CPC . B60R 21/13; B60R 21/00; B60R 2021/0018; B60R 2021/132
See application file for complete search history.

(56) References Cited

U.S. PATENT DOCUMENTS

| | | | | |
|---|---|---|---|---|
| 4,148,504 A | * | 4/1979 | Rushing | B60R 21/13 182/153 |
| 5,000,480 A | * | 3/1991 | Straka | B60Q 1/2611 280/756 |
| 5,028,071 A | * | 7/1991 | Bolam | B60R 21/13 280/756 |
| 7,032,927 B1 | | 4/2006 | Joranlien | |
| D892,024 S | * | 8/2020 | Li | D12/222 |
| 2003/0198509 A1 | * | 10/2003 | Barth | B62D 33/044 403/180 |
| 2010/0045074 A1 | * | 2/2010 | Friedman | B60R 21/13 296/210 |
| 2014/0125044 A1 | * | 5/2014 | Mantovani | B60R 21/13 280/756 |

FOREIGN PATENT DOCUMENTS

| | | |
|---|---|---|
| GB | 1021561 A | 3/1966 |
| GB | 2376212 A | 11/2002 |
| JP | 04310448 H | 2/1992 |

OTHER PUBLICATIONS

International Search Report issued in International Application No. 201800005218, completed Oct. 24, 2018; 8 pages.

* cited by examiner

*Primary Examiner* — Drew J Brown
(74) *Attorney, Agent, or Firm* — Cantor Colburn LLP

(57) ABSTRACT

An upgrade kit for an original roll-bar of a historic single-seater car, comprising an additional roll-bar with the shape of an inverted U or V and identifying second two ends operatively lower, and wherein each of said second two ends is adapted to be associated with first two ends of said original roll-bar by means of reversible connection means and at least one additional bracing rod adapted to be connected between a vertex of said additional roll-bar and said frame or an engine block of said historic single-seater car; the additional roll-bar being operatively superimposed to said original roll-bar.

13 Claims, 3 Drawing Sheets

UPGRADE KIT FOR A ROLL-BAR OF A HISTORIC SINGLE-SEATER CAR AND UPGRADE METHOD OF A ROLL-BAR OF A HISTORIC SINGLE-SEATER CAR

CROSS-REFERENCE TO RELATED APPLICATIONS

This patent application claims priority from Italian Patent Application no. 102018000005218 filed on May 9, 2018, the entire disclosure of which is incorporated herein by reference.

TECHNICAL FIELD OF THE INVENTION

The invention relates to a roll-bar for historic single-seater cars (also known as open-wheel cars or formula cars).

STATE OF THE ART

The single-seater cars that used to be used in Formula 1 races in the past decades are still used nowadays in amateur competitions for historic cars. Even though said competitions are dedicated to specific categories of historic cars, the safety standards set by the FIA (Fédération Internationale de l'Automobile) must be also observed by these historic cars.

The FIA recently intervened in the designing of roll-bars. As it is known, a roll-bar is a tubular element, usually with the shape of an arc, which projects at the top of the body of the car immediately behind the driver's seat, thus playing a particularly crucial role in case of roll-over of the car, preventing the driver from being crushed under the weights thereof.

Roll-bars, especially the ones of historic cars, are an integral part of the frame of the single-seater car. Moreover, many car manufacturers used to print a serial number identifying the car on the roll-bar.

Therefore, an adjustment of historic single-seater cars to the aforesaid FIA standards can lead to a change in the original roll-bar, also through the replacement with a roll-bar that complies with the size and resistance requirements set forth by the FIA.

This operation would cause a significant damage to the historic character of the cars undergoing this treatment.

Indeed, the value of a vehicle is strictly connected to the degree of authenticity thereof. Said degree of authenticity relates not only to decorations and details, but also to the body and the frame defining the essence of the vehicle.

Valuable vehicles were often manufactured in a small number of models. Single-seater cars designed for Formula 1 races were produced in a very small number of models. The bodies and the frames were often manufacturing by hand and, anyway, the original spare parts are not available any longer.

The removal or change of a portion of the frame, such as the roll-bar, represents a sort of "violence" inflicted to the vehicle, which forces owners to refrain from wanting to be part of the aforesaid races, so as not to see their cars disfigured.

If not specifically excluded by the detailed description below, the information contained in this part should be considered as an integral part of the detailed description itself.

SUMMARY OF THE INVENTION

The object of the invention is to offer a solution which allows competition single-seater cars to comply with the requirements set forth by the FIA without being disfigured.

The idea on which the invention is based is that of manufacturing an additional roll-bar made of a high-resistance material, which is partially supported by the original roll-bar as well as in other points of the car.

More in particular, the idea is that of installing an additional roll-bar, which defines a sort of "extension" and reinforcement of the original roll-bar, when regulations ask race contenders to do so. The additional roll-bar is fitted so as to project at the top relative to the original roll-bar, for it is fixed on the original roll-bar without damaging it, and comprises additional bracing rods, which are going to be fixed to the rear cradle of the frame where the engine block is housed and/or to the engine block of the single-seater car.

Therefore, it is evident that possible stresses undergone by the original roll-bar are only a portion of the stresses that can be borne by the additional roll-bar, as another portion of these stresses is released to other points of the frame by means of the additional bracing rods.

The engine block, as it is known, is fixed to the frame and is the heaviest and most rigid portion of the entire single-seater car.

The additional roll-bar, as a whole, is a strengthening device which directly cooperates with the frame of the car. According to a preferred variant of the invention, the additional roll-bar comprises a portion with the shape of an upside-down V or U, whose the lower ends are shaped so as to adhere to the original roll-bar and be fixed to the latter by means of collars, which surround the original roll-bar, clamping it inside the collars.

When the collars are manufactured as one single piece together with the additional roll-bar, they clamp the original roll-bar.

If the collars are separate from the additional roll-bar, they clamp the original roll-bar together with the shaped ends of the additional roll-bar.

A first group of bracing rods is fixed, at a first end, to the vertex of the arc defined by the original roll-bar and, at a second end which is opposite the first one, to the engine block, in particular to the heads of the engine blocks. Said first group of bracing rods can be original or can be added within the scope of the invention.

A second group of bracing rods is fixed, at a first end, to the vertex of the portion of the additional roll-bar with the shape of an upside-down V and, at a second end which is opposite the first one, to the engine block, in particular to the heads of the engine blocks.

If the first group of bracing rods was not originally provided, it can be connected to the original roll-bar by means of a proper collar or by means of a pin, which is threaded into a complementary threaded hole originally made in the original roll-bar to lift the car.

The groups of bracing rods are preferably available in pairs, so that a rod of a pair has said second end fixed in a point of the frame or of the engine block that is symmetrical, relative to the longitudinal development of the single-seater car, to the fixing point of the second end of the other rod of the pair.

Since single-seater cars, except for some small details, generally are symmetrical relative to the axis of their longitudinal development, the additional roll-bar preserves said symmetry.

The first and the second group of bracing rods can converge in a same point of the engine block or they can converge in different points.

Therefore, the invention relates to a removable upgrade kit for a roll-bar of a single-seater car and to a method for upgrading said single-seater car.

The invention also relates to a single-seater car provided with a roll-bar to which an additional roll-bar according to the kit described herein is applied.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

Figure 1:
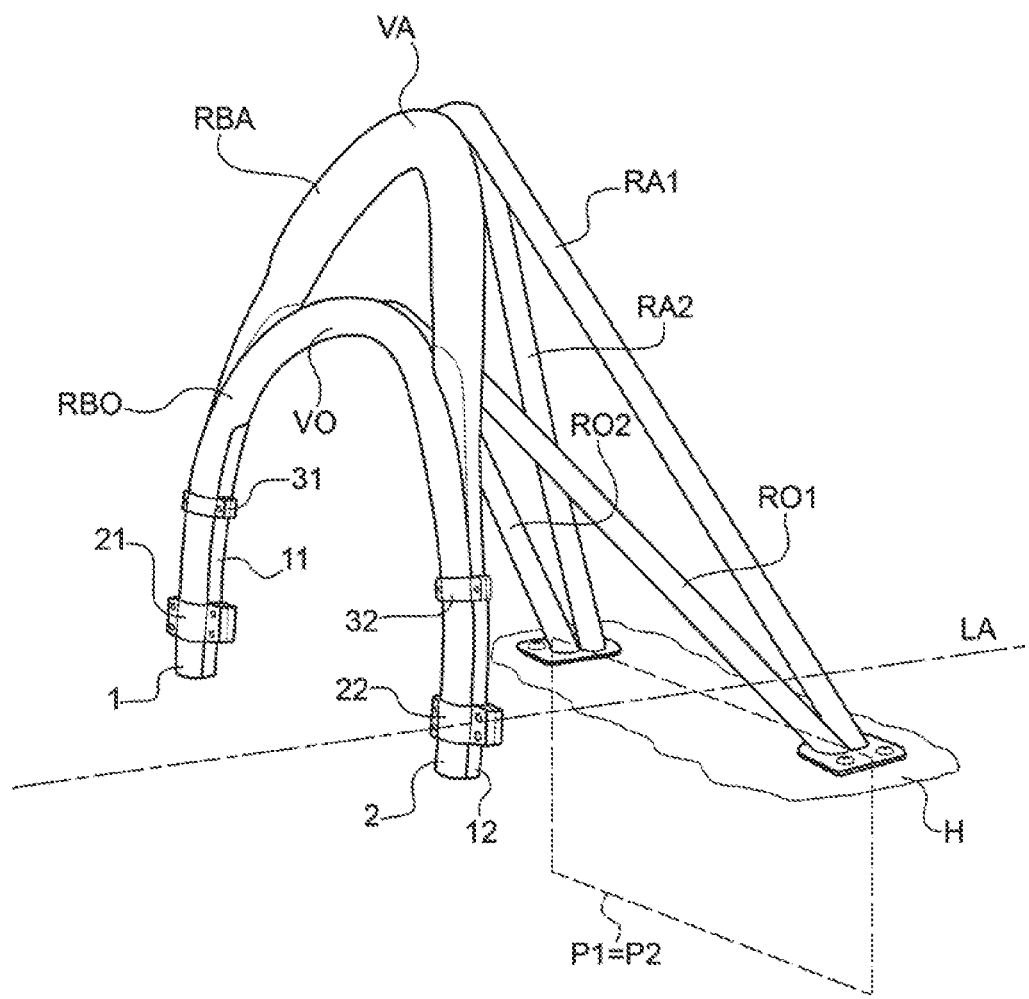
FIGS. 1 and 2 show two examples of a roll-bar upgrade kit according to the invention.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

DETAILED DESCRIPTION OF EMBODIMENTS

A single-seater car MPS usually comprises four wheels W on the outside of the car body CV, with a central tapered body where one single seat is housed to accommodate the driver.

At the back of the seat there is the internal combustion engine, generically indicated as "engine block".

There can also be a front spoiler and/or a rear spoiler to improve the downforce of the car, so as to improve the so-called "aerodynamic force".

Between the driver's seat S and the cradle housing the engine block H there is the roll-bar, which projects at the top of the driver's seat so as be above the driver's head. The roll-bar designed and manufactured when the entire single-seater car MPS was produced is hereinafter referred to as "original roll-bar" RBO, as it is part of the frame of the single-seater car.

The original roll-bar RBO of a historic single-seater car MPS is generally obtained by means of a solid or hollow tubular element, which is bent so as to generically define the shape of an upside-down U or V, thus identifying relative first, operatively lower ends 1, 2, which are directly connected to the frame of the historic single-seater car.

These ends are generally fixed to the frame of the single-seater car in a non-reversible manner.

According to the invention, the kit comprises an additional roll-bar RBA obtained by means of a solid or hollow tubular element, which is bet so as to generically define the shape of an upside-down U or V identifying two second, operatively lower ends 11, 12, wherein each one of said two second ends is adapted to be associated with two first ends of the original roll-bar by means of reversible connection means 21, 22, 31, 32, and at least one additional bracing rod RA1, RA2 adapted to be connected between a vertex VA of the additional roll-bar and said frame or an engine block H of the historic single-seater car.

When the additional roll-bar is operatively associated with the single-seater car, it stands above the original roll-bar.

Each one of the two second ends 11, 12 of the additional roll-bar is shaped so as to be complementary to the two first ends 1 and 2 of the original roll-bar so as to be joined and adhere to a relative outer surface.

In order to improve a mutual adhesion, the second ends are, at least in a first extreme portion, concave with a concavity that is perpendicular to a respective development axis of each end, so that the second ends are adapted to adhere to side surface of said two first first ends facing them at the back and/or on the side or at the front and/or on the side relative to a longitudinal development LA of said historic single-seater car.

In relation to the mutual position between the seat, the original roll-bar and the engine block, the original roll-bar can be fixed to the side surfaces of the first ends 1 and 2 at the front, on the side or at the back and in relative intermediate positions.

Figure 2:
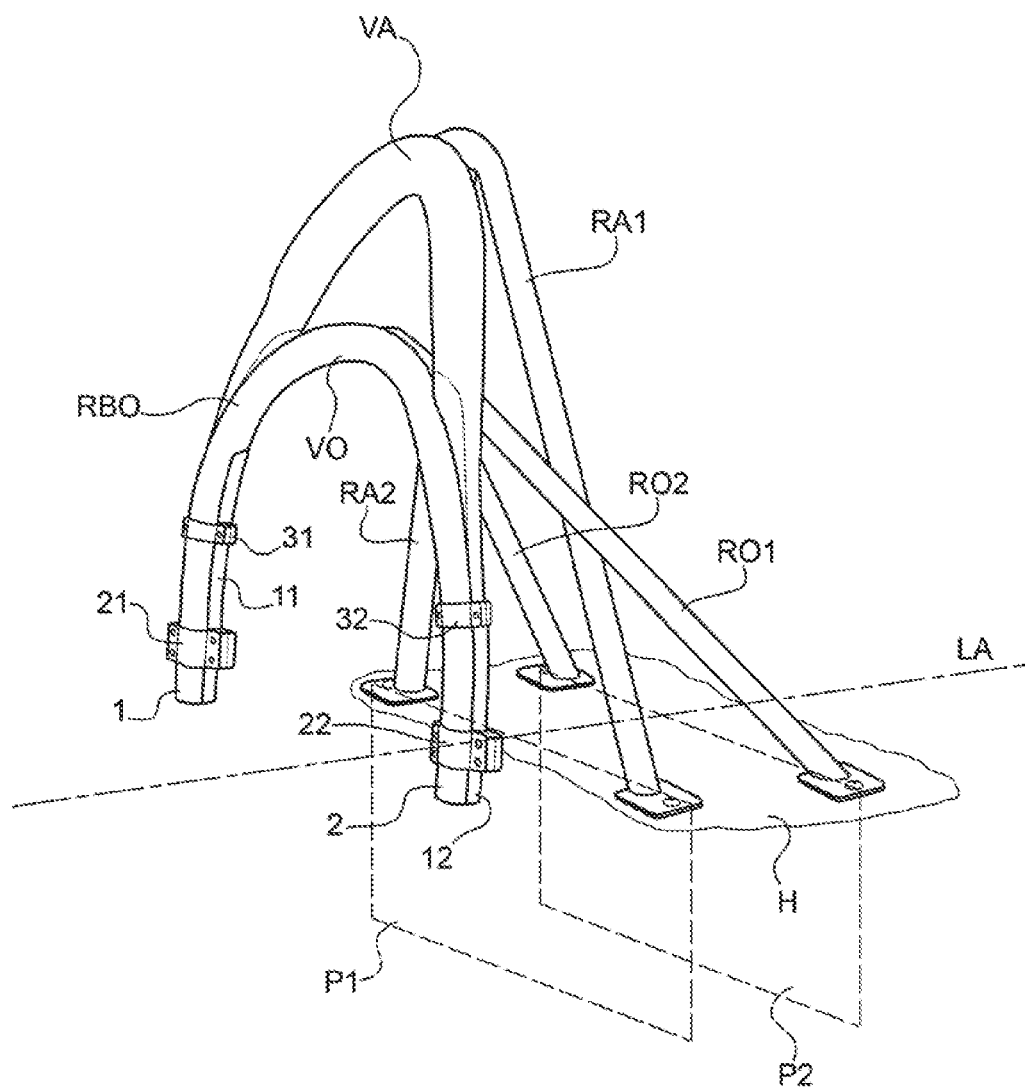
Figure 3:
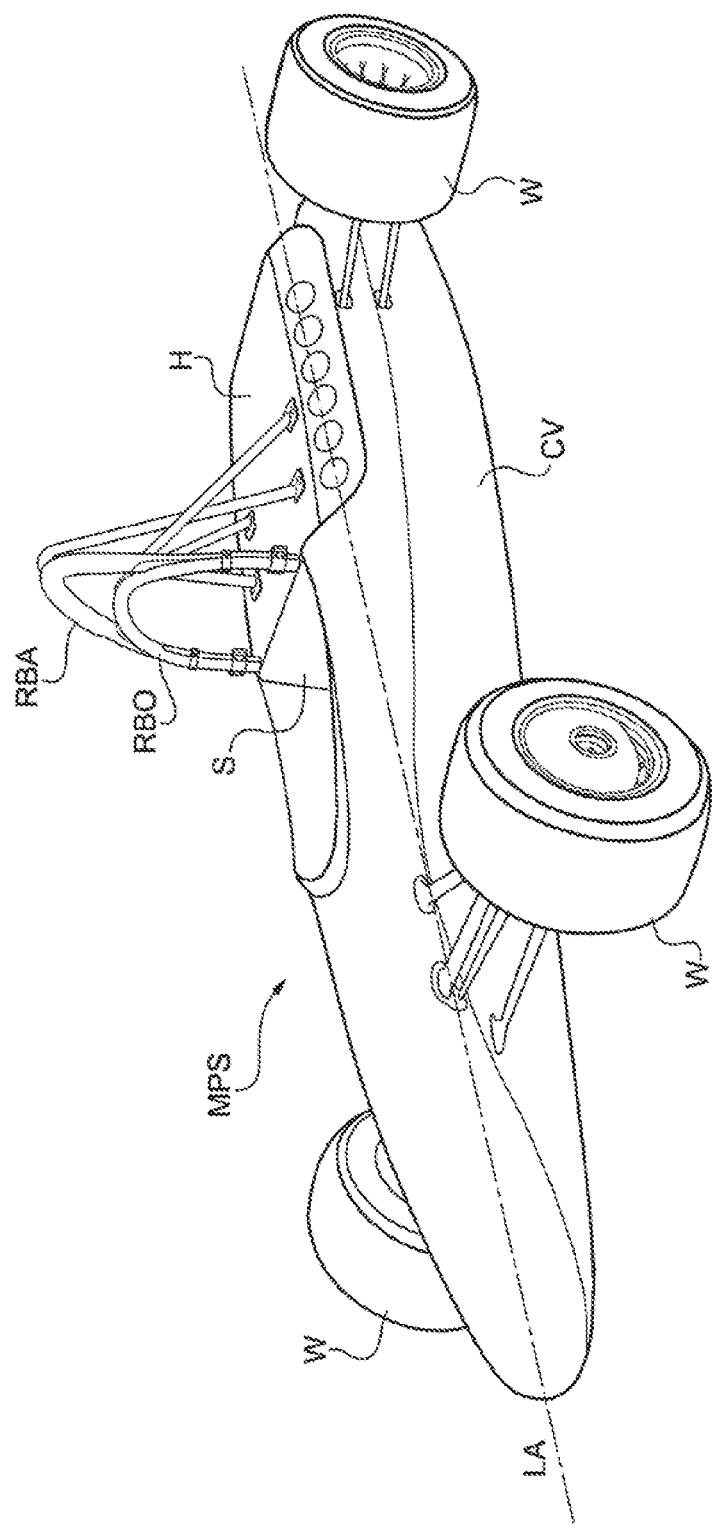
FIG. 3 shows a view of a single-seater car implementing a roll-bar upgrade kit according to FIG. 2.

FIGS. 1 and 2 clearly show that the second ends 11 and 12 and tangent and adhere to the rear surfaces of the respective first ends 1 and 2 of the original roll-bar.

The reversible connection means 21, 22, 31, 32 comprise collars, which are adapted to be tightened around said two first ends so as to anchor said second ends to said original roll-bar.

One of said collars can be manufactured as one single piece together with a respective end of said two second ends 11, or it can be a separate component relative to the additional roll-bar and be fitted so as to clamp together the ends of the original roll-bar and of the additional roll-bar.

Two pairs of collars are used, so as to have two collars for each pair of ends connected together.

In this way, two mutual connection points are obtained, which ensure an ideal stress distribution between the additional roll-bar and the original roll-bar.

According to FIGS. 1 and 2, a pair of additional bracing rods RA1, RA2 is preferably connected between said vertex VA of said additional roll-bar and said frame or engine block H of said historic single-seater car, and wherein ends of said rods of said pair of additional bracing rods are connected to said frame or engine block in points belonging to a second plane P2, which is perpendicular to a longitudinal development LA of said historic single-seater car MPS.

If it was not originally provided, a further pair of bracing rods RO1, RO2 can be connected between a vertex VO of said original roll-bar RBO and said frame or engine block H of said historic single-seater car.

The ends of the rods of said further pair of bracing rods are connected to said frame or engine block in points belonging to a first plane P1, which is perpendicular to a longitudinal development LA of the historic single-seater car MPS.

The first plane is interposed between a seat S of the single-seater car and the aforesaid second plane P2, see FIG. 2, or the first plane P1 and the second plane P2 coincide.

The invention also relates to a method for upgrading a roll-bar of a historic single-seater car comprising a step of associating an additional roll-bar according to any one of the variants described above. A layer of elastomeric material is preferably interposed between said connection means 21, 22, 31, 32 and the first ends of the original roll-bar.

If they were not originally provided, said further bracing rods RO1, RO2 can be fixed to the original roll-bar by means of another collar or, if present, by means of a hole which was originally intended to lift the entire car through the original roll-bar.

The non-limiting example described above can be subjected to variations, without for this reason going beyond the scope of protection of the invention, comprising all embodiments that, for a person skilled in the art, are equivalent to the content of the claims.

When reading the description above, a skilled person can carry out the subject-matter of the invention without introducing further manufacturing details.

The invention claimed is:

1. An upgrade kit for an original roll-bar (RBO) of a historic single-seater car (MPS), the original roll-bar made by means of a solid or hollow tubular element, bent to generically define an inverted U or V shape, by identifying relative first ends (1, 2) operatively lower and directly connected to a frame of said historic single-seater car, the kit comprising
an additional roll-bar (RBA) implemented by a solid or hollow tubular element bent to generically define an inverted U or V shape, by identifying relative second two ends (11, 12) operatively lower, and wherein each of said second two ends is adapted to be associated with said first two ends, by means of;
reversible connection means (21, 22, 31, 32), and
at least one additional bracing rod (RA1, RA2) adapted to be connected between a vertex (VA) of said additional roll-bar and said frame or an engine block (H) of said historic single-seater car,
the additional roll-bar being sized so that, in operating conditions, it is superimposed to said original roll-bar.

2. The kit according to claim 1, wherein each of said second two ends (11, 12) are shaped so as to complementarily join with and adhere on an outer surface of said first two ends.

3. The kit according to claim 2, wherein said second ends are concave, at least for a first extreme portion.

4. The kit according to claim 3, wherein said second ends are adapted to adhere to outer surfaces of said first two ends facing posteriorly and/or laterally or frontally and/or laterally, a longitudinal development (LA) of said historic single-seater car.

5. The kit according to claim 1, wherein said reversible connection means (21, 22, 31, 32) comprise collars adapted to tighten around said first two ends for anchoring said second ends to said original roll-bar or by means of a pin, which is threaded into a complementary threaded hole originally made in the original roll-bar to lift the car.

6. The kit according to claim 5, wherein at least one of said collars is in one piece with a respective end of said second two ends (11, 12).

7. The kit according to claim 1, comprising a pair of additional bracing rods (RA1, RA2) connected between said vertex (VA) of said additional roll-bar and said frame or engine block (H) of said historic single-seater car, and wherein ends of said rods of said pair of additional bracing rods are connected to said frame or engine block at points belonging to a second plane (P2) perpendicular to a longitudinal development (LA) of said historic single-seater car (MPS).

8. The kit according to claim 1, wherein a further pair of bracing rods (RO1, RO2) is connected between a vertex (VO) of said original roll-bar (RBO) and said frame or engine block (H) of said historic single-seater car.

9. The kit according to claim 8, wherein ends of said rods of said further pair of bracing rods are connected to said frame or engine block in points belonging to a first plane (P) perpendicular to a longitudinal development (LA) of said historic single-seater car.

10. The kit according to claim 9, wherein said first plane is interposed between a seat (S) of said single-seater car and said second plane (P2) or wherein said first and said second planes coincide.

11. A method for upgrading a roll-bar of a historic single-seater car comprising a step of associating an additional roll-bar according to claim 1.

12. The method according to claim 11, further comprising a step of interposing a layer of elastomeric material between said connection means (21, 22, 31, 32) and said first ends of said original roll-bar.

13. A single-seater car comprising an original roll-bar (RBO) made by means of a solid or hollow tubular element, bent to generically define an inverted U or V shape, by identifying relative first ends (1, 2) operatively lower and directly connected to a frame of said historic single-seater car, the single-seater car comprises a kit including
an additional roll-bar (RBA) implemented by a solid or hollow tubular element bent to generically define an inverted U or V shape, by identifying relative second two ends (11, 12) operatively lower, and wherein each of said second two ends is adapted to be associated with said first two ends, by means of;
reversible connection means (21, 22, 31, 32), and
at least one additional bracing rod (RA1, RA2) adapted to be connected between a vertex (VA) of said additional roll-bar and said frame or an engine block (H) of said historic single-seater car,
the additional roll-bar being sized so that, in operating conditions, it is superimposed to said original roll-bar.

* * * * *